Patented Apr. 19, 1932

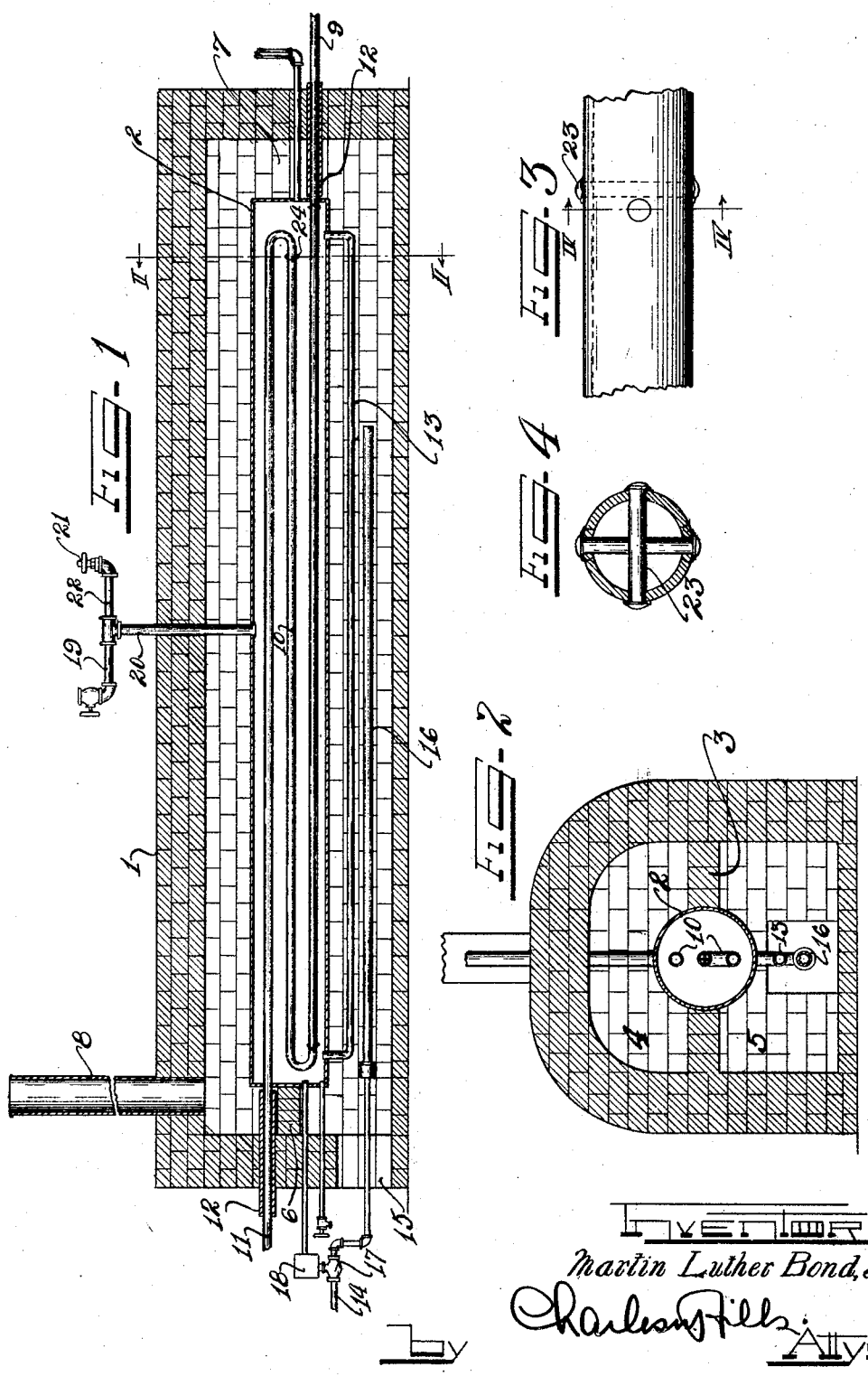

1,855,042

UNITED STATES PATENT OFFICE

MARTIN LUTHER BOND, JR., OF SAND SPRINGS, OKLAHOMA

DEVICE AND METHOD FOR TREATING OIL CONTAINING BOTTOM SETTLINGS FROM OIL WELLS

Application filed February 27, 1928. Serial No. 257,323.

This invention relates to a device and method for treating oil containing bottom settlings from oil wells.

It is an object of this invention to provide a device and method for treating oil containing bottom settlings from oil wells, wherein provision is made for preventing overheating of the oil and wherein the operation of the device is continuous and requires little if any attention.

Other and further important objects of this invention will be apparent from the disclosures in the specification and the accompanying drawings.

This invention (in a preferred form) is illustrated in the drawings and hereinafter more fully described.

On the drawings:

Figure 1 is a longitudinal cross-sectional view of a device embodying the principles of my invention, with parts in elevation;

Figure 2 is an enlarged sectional view taken on line II—II of Figure 1;

Figure 3 is a fragmentary detail view; and

Figure 4 is a sectional view taken on line IV—IV of Figure 3.

My invention is especially adapted to the treatment of oil containing bottom settlings from scattered or isolated oil wells where the volume of such oil to be treated is so small as not to warrant continual attention from an operator. My device, therefore, is practically automatic and continuous in its operation, requiring little if any attention. By "bottom settlings" is meant a water in oil emulsion, the water phase containing varying amounts of sodium, calcium and magnesim chlorides.

The reference numeral 1 indicates an oven housing suitably formed of masonry or the like and preferably considerably longer than its other dimensions. A tubular member, or water drum 2 is mounted within the chamber formed by said housing 1 in spaced relation to the walls of said housing by means of a horizontal baffle 3 dividing said chamber into upper and lower sections 4 and 5 respectively. Said baffle 3 is continuous at one end as at 6, but discontinuous at the other end to provide a passage 7 for products of combustion formed in the lower section 5. A stack 8 is positioned in the upper wall of the housing 1 at the other end from the passage 7 so that the products of combustion will have the longest possible length to travel before passing up the stack 8.

A pipe 9, which serves to conduct oil containing bottom settlings into the device, extends through one end of the housing 1 and connects with a coil of piping 10 positioned within the water drum 2. After circulating through said coil 10 the oil containing bottom settlings is discharged through an outlet pipe 11 passing through the other end of said housing 1.

Both the inlet and discharge ends 9 and 11 respectively are encased within protecting sheaths or sleeves 12 to prevent the oil from becoming overheated where exposed directly to heat.

The water drum 2 is provided with a single boiler tube 13 extending substantially the length of the drum 2 and connecting into said drum at its respective ends. A fuel pipe 14 enters said housing 1 through an opening 15 provided for the purpose, and connects with a perforated burner pipe 16 positioned directly below and closely adjacent to the boiler tube 13. Natural gas is preferably used as fuel since it is readily obtained in oil well fields. A valve 17 is provided in the fuel line 14 for controlling the flow of fuel. The valve 17 is preferably automatically controlled by means of a thermostat device 18 communicating with the interior of the water drum 2 and governed by the temperature of the water therein.

Water is admitted to the drum 2 through a valve controlled pipe 19 connecting with a short vertical pipe 20 leading into said drum 2. A relief valve 21 is provided in the branch line 22 from the pipe 20 to prevent accumulation of pressure within the water drum 2.

Ordinarily the water in the drum 2 will be kept between 140° and 212° F., since at these temperatures the temperature of the oil will be such that the action of the compound with which the oil is treated is most effective. The corresponding temperatures of the oil will in general be between 65° and 115° F. The compound with which the oil is treated is in general one which will form in the emulsion an electrolyte with an excess of ions of a different charge from that carried by the emulsion, so as to neutralize the charge on the emulsion and break down the same. The breaking down of the emulsion by this method and the compounds employed are well-known in the art, there being a large number of such agents on the market at the present time.

The oil containing bottom settlings is pumped to my heater device through the pipe 9 by means of the oil well pump that removes the oil from the well. This fact is important as it means that no secondary pumping operation is necessary.

If the oil containing bottom settlings is to be treated to facilitate separation of the good oil from the water, the desired compound for treating the oil containing bottom settlings to break down the water oil emulsion is always added before the oil is run into the device. In order to insure thorough mixing of the treating compound and the oil containing bottom settlings, a criss-cross arrangement of rivets 23 is formed at various points in the coil 10, such as just in advance of the ends of said coil as at 24. It will be understood, however, the separation process can be carried out with some degree of success without the addition of a treating compound.

By treating oil containing bottom settlings in my device, a very satisfactory grade of oil can be obtained where formerly such oil was merely burned as so much waste. One of the principal advantages of my device is that the bottom settlings are nowhere submitted to direct heat and there is therefore no danger of the oil becoming overheated, or, as commonly expressed, "burned".

The single boiler tube 13 permits a constant circulation of the water in the drum 2, thus equalizing the temperatures at various points in the drum. The thermostatic control 18 on the fuel valve 17 prevents waste of fuel and overheating of the water in the drum 2. Consequently there is very little replacement of water necessary due to this careful control of the temperature. As the supply of water in oil fields is often limited, this is also an important factor.

It will be understood that instead of treating oil containing bottom settlings as it comes from the wells, the bottom settlings may be first separated by an ordinary settling process and the bottom settlings together with the treating compound then passed through my device. It has been found that a good usable oil can much more readily be obtained from oil containing bottom settlings by the use of my method and device than formerly.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A device for treating oil containing bottom settlings from oil wells, comprising an oven housing, a water drum therein, piping within said drum for the circulation of the oil containing bottom settlings therethrough, a boiler tube extending along the bottom of said water drum and communicating with the ends thereof and means beneath said tube for heating the same.

2. A device for treating oil containing bottom settlings from oil wells, comprising an oven housing, a water drum therein, piping within said drum for the circulation of the oil containing bottom settlings therethrough, a boiler tube extending along the bottom of said water drum and communicating with the ends thereof, means beneath said tube for heating the same, a horizontal baffle dividing said oven into upper and lower sections communicating at one end and a stack at the other end of said oven, in such a manner that the upper portion of the water drum is exposed to the interior of the upper section of the oven, and the lower surface of said drum is exposed to the lower surface of the oven.

In testimony whereof I have hereunto subscribed my name.

MARTIN LUTHER BOND, Jr.